United States Patent Office 3,227,809

Patented Jan. 4, 1966

3,227,809

TIME DIVISION MULTIPLEX ELECTRICAL SIGNALLING SYSTEMS

Geoffrey Francis Croft and John Christopher Hammond Davis, Taplow, England, assignors to British Telecommunications Research Limited, Taplow, England, a British company Filed Dec. 1, 1961, Ser. No. 156,235
Claims priority, application Great Britain, Dec. 2, 1960, 41,577/60
6 Claims. (Cl. 179—15)

Figure 1:
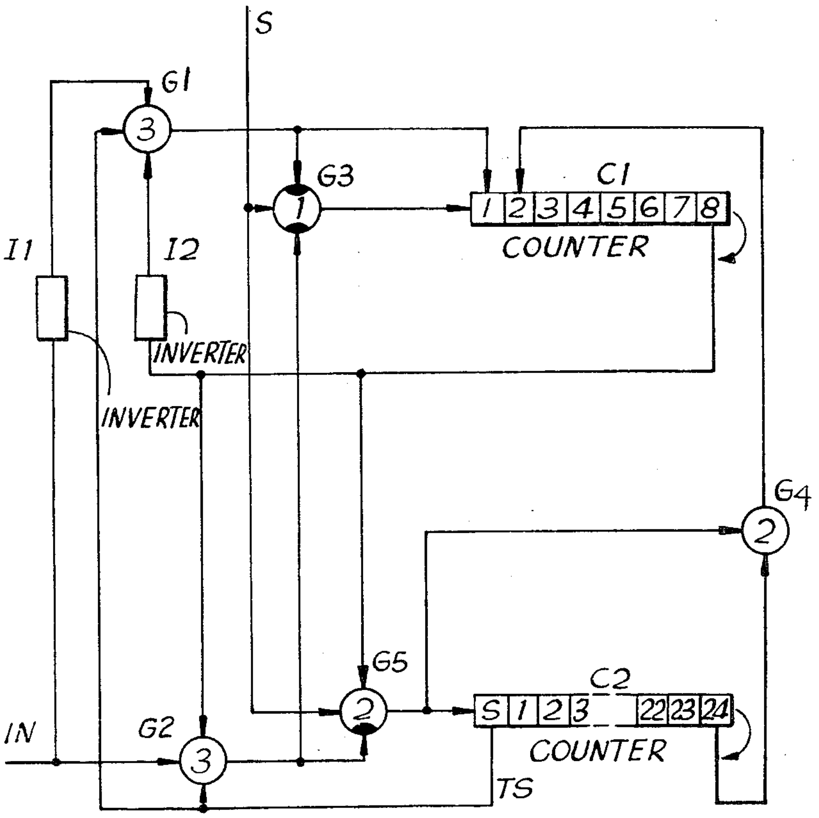

The present invention relates to electrical signalling systems and is particularly concerned with those operating on a pulse code modulation or similar basis and using time division multiplex methods of combining several signals. As is well-known, in such a system a number of signal waveforms, for instance speech, are transmitted over a common channel by associating the common channel with the different inputs successively and employing a sampling rate which is at least twice as high as the highest modulation frequency it is desired to transmit; for instance in the case of speech the sampling rate might be 8,000 per second. The information derived from this sample is converted into a numerical value by a quantising process and this may then be conveniently transmitted in binary form.

It will be appreciated that with this arrangement the signals relating to the different individual channels are transmitted in succession and it is very important to know where the sequence starts. Accordingly it is generally arranged that at some stage in the complete cycle, which is usually referred to as a frame, a synchronising signal is included which will ensure that the receiving equipment does not get out of step with the transmitting equipment with resultant mutilation of signals. It is desirable if possible that the synchronising signals should be of a special character which can readily and reliably be distinguished from the information signals and more particularly that there should be small likelihood that an information signal which simulates a synchronising signal should be repeated at the frame frequency. The present invention relates to an improved method of meeting these requirements which also has other advantages in connection with the multiplexing of a plurality of different systems such as can conveniently be done using a waveguide.

According to one feature of the invention, in a time division multiplex electrical signalling system employing signalling elements of two kinds and having one channel of each frame assigned to a characteristic synchronising signal, responding equipment is arranged to test the signal received on the synchronising channel during each frame and to treat it as acceptable so as to permit the operation to continue only if the signal comprises a predetermined minimum number of consecutive elements of one kind followed by an element of the other kind.

According to another feature of the invention, in a time division multiplex electrical signalling system employing signalling elements of two kinds and having one channel of each frame assigned to a characteristic synchronising signal, responding equipment is arranged to test the signal received on the synchronising channel during each frame and to permit the operation to continue indefinitely if the received signal differs in a predetermined manner from the characteristic signal while if the operation is held up owing to the signal received on the synchronising channel differing in other than the said predetermined manner from the characteristics synchronising signal and being therefore unacceptable, it is only resumed when the characteristic synchronising signal is detected.

For the sake of example it will be assumed that the system will deal with 24 speech channels and that a separate channel is employed for the synchronising signal, thus making a total of 25 channels. Moreover it is arranged that the amplitude of the waveform sample is signalled by means of seven binary elements or digits, which may mean that the amplitude is divided into 128 levels using straight binary notation or that a larger number of levels is used and that some form of non-linear encoding is subsequently employed to reduce the number of digits needed. A further element at the beginnig of each binary series is set aside for other signalling purposes which may be required, so that a complete frame comprises $8 \times 25 = 200$ elements. If, as also suggested above, the sampling frequency is 8,000 per second, it will follow that transmission takes place at the rate of 1,600,000 elements per second.

The choice of synchronising signal must be influenced by the probability of a combination of digits in the information channels simulating the synchronisation pattern, causing the synchronising circuits to lock on at this position for a short time, and by the ease with which it is possible to recognise the pattern at the receiving terminal.

A pattern involving a consecutive series of digits of one kind for all but one of the total number and either the first or the last of the opposite type is easy to recognise and deal with. If all the digits are of the same kind, there is a high probability that another digit of the same kind will precede them in an information channel and thus simulate a synchronisation pattern one digit early. If more than one digit is of the second type, an additional reset position is required on the counter as will appear subsequently. For example, if the pattern 00001111 were used, the detector would start by recognising 0's but if a 1 should occur before any of the 0's, a reset must be operated and the next 0 treated as through it were the first of a synchronisation pattern. If, however, the counter has counted four 0's and up to three 1's and then receives a 0, it would have to be reset so that if the succeeding signal is a 0 it would be treated as the second of a synchronisation pattern.

The simple pattern containing only one digit of the alternate type requires a single reset only and with this arrangement until a digit of the correct type is received other digits preceding it can be ignored. The like digits require one reset only.

The arrangement employing several digits of one kind followed by one of the other kind has special advantages where a number of P.C.M. systems are multiplexed together, for instance for transmission over a waveguide operating in the HO1 mode as the counters at the receiving end can be arranged to reset one or more digits in advance so as to allow the system to accept fewer digits of the first kind than are normally transmitted in the synchronising signal. In such a case it is important for satisfactory transmission that the various systems should in fact be in phase but it is imposible to achieve this steadily without a master clock common to all the systems as there is always a slow drift between them. Consequently it is arranged that all systems not in synchronism with the HO1 system have arrangements for introducing a delay of half an element when the phase difference from the HO1 system has built up to approximately this value. If the drift continues, it may subsequently be necessary to cut out the delay and as a consequence one signalling element will then have been either omitted or repeated. It is desirable that this should not take place in the information channels and the arrangement according to the invention readily permits it to be introduced into the synchronising channel.

The invention also contemplates an arrangement making use of the so-called flywheel effect whereby a short burst of interference on the line will not upset synchronism since the circuit requires repeated failure of the synchronising signal before remedial action is taken.

Figure 2:
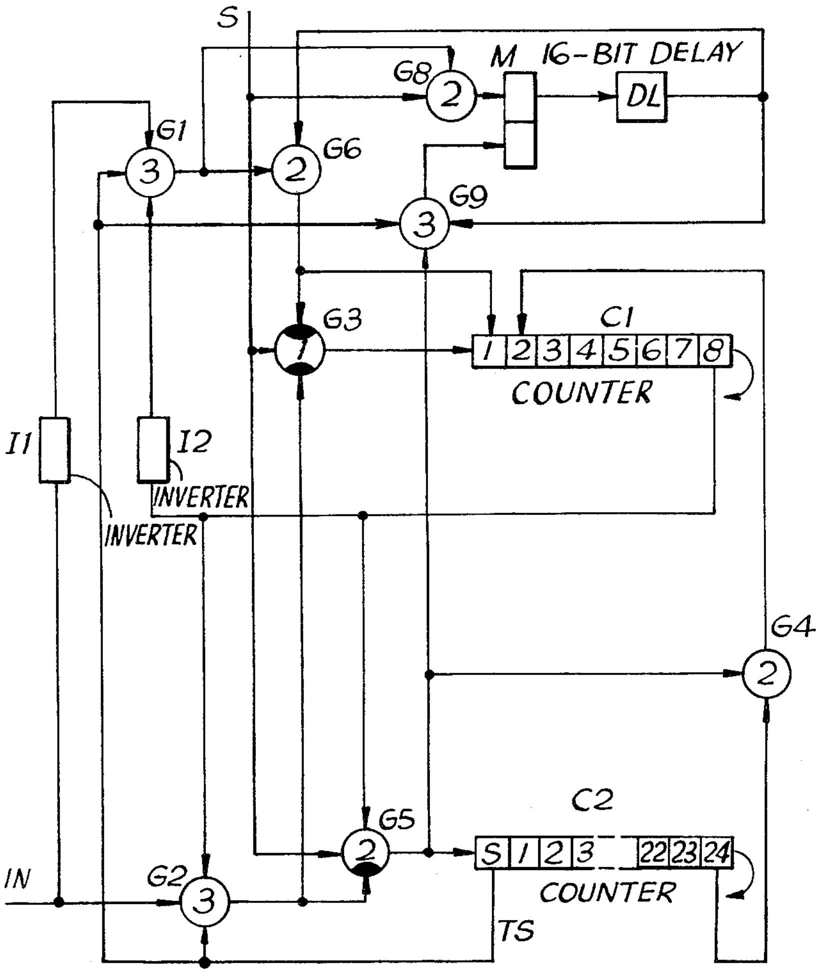
Figure 3:
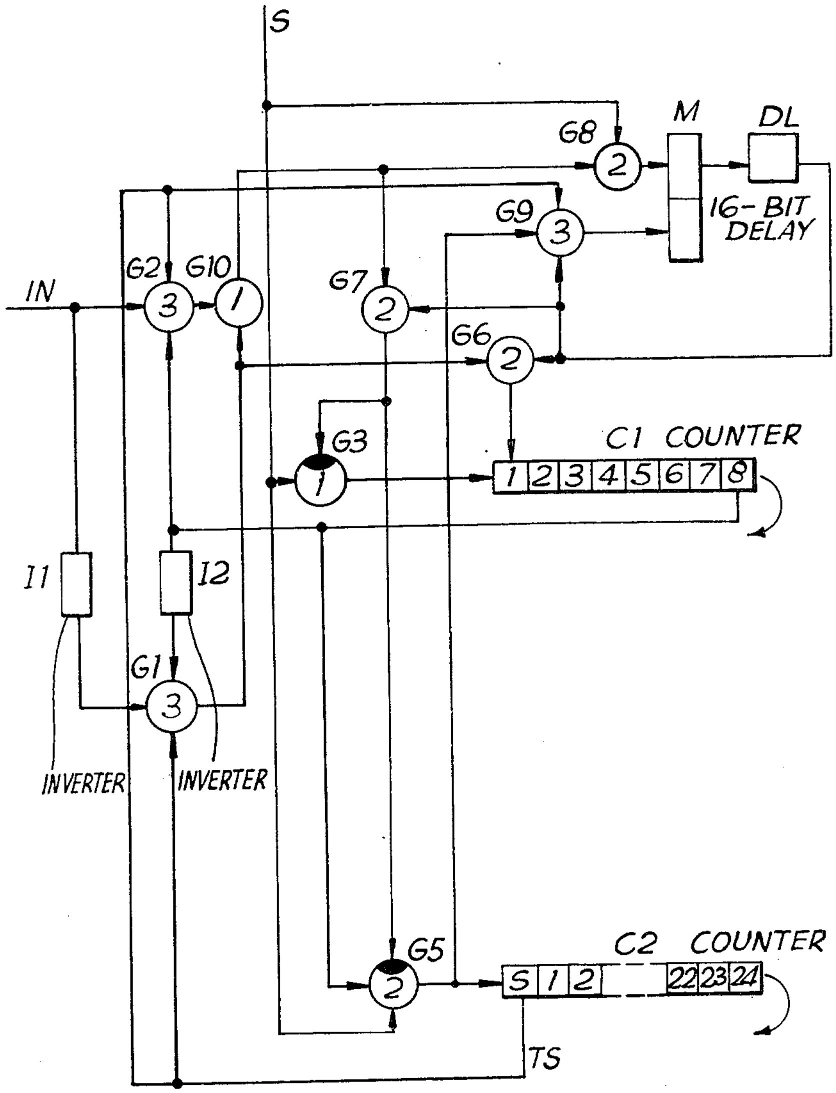

The invention will be better understood from the following description of three detailed circuits which should be taken in conjunction with the accompanying drawings comprising FIGURES 1–3. FIGURE 1 shows the basic simplified circuit for effecting synchronisation. FIGURE 2 shows a circuit employing the same general principles but making use of a flywheel effect which allows certain tolerances in the received synchronising signal. FIGURE 3 is an alternative circuit giving substantially similar facilities.

The arrangement of FIGURE 1 assumes the figures mentioned above, namely 8 elements per channel and 25 channels per frame, and that a normal synchronising signal comprises seven 1's followed by a 0. Control is effected by means of two cyclic counters of any suitable type, for instance, electronic ring counters. One of these, C1, is an 8-stage counter directly operated by strobe pulses but with facilities for reset to either position 1 or position 2 while the other counter, C2, is a straightforward 25-stage counter also operated by strobe pulses in conjunction with a pulse from the eighth stage of the counter C1. The counter C2 will preferably be arranged to effect the necessary channel switching.

Considering the operation from the beginning of a frame, counter C1 cycles continuously in response to strobe pulses and for each cycle advances counter C2 one stage. During each synchronising signal, however, that is to say while counter C2 is in the S position, a special test is made to check whether a correct synchronising signal is being received. Thus, when counter C2 reaches position 24, the next strobe after counter C1 reaches position 8 drives it to the synchronising position S and also via gate G4 a circuit is completed for resetting the counter C1 to its second position.

If gate G4 is omitted, so that counter C1 moves from position 8 to position 1 in the normal cyclic manner, the system will only recognize patterns of seven or more 1's followed by a 0 as a synchronising signal. With G4 connected as shown so as to reset counter C1 to position 2, the system will recognize six or more 1's followed by a 0 as an acceptable synchronising signal. If G4 were arranged to restore the counter C1 to position 3, only five 1's followed by a 0 would be required to form an acceptable synchronising signal and similarly for smaller numbers.

In the synchronising position of the counter C2, an output TS is obtained and this is used for testing the nature of the signal received over the line IN during the synchronising channel. It will be understood that use is also made of the inverse of the signal and that gates G1 and G2 are both responsive to a 1. This will appear on the inverse input when the actual line signal is a 0 owing to the presence of the inverter I1. If a 1 is present on the synchronising channel as would be expected if the correct synchronising signal 11111110 is received, neither of the gates G1 and G2 is opened and the counter C1 is driven to position 8 by the subsequent 1's. Any further 1's received have the effect of opening gate G2 so that further movement of the counters is prevented by the inhibiting gates G3 and G5. This state continues until a 0 is received when stepping is resumed and the system is properly synchronised. If gate G4 is omitted, the counter C1 will commence stepping from position 1 and seven 1's will be required before position 8 is reached. If G4 resets to position 2 as shown in FIGURE 1, six 1's will be required to drive C1 to position 8. It will be appreciated that the effect of the inverter I2 is to ensure that the gate G1 receives an input in positions 1 to 7 of the counter C1 but not in position 8.

If, however, a 0 appears on the line before counter C1 reaches position 8, gate G1 opens and in addition to closing gate G3 resets the counter to position 1. The counter C1 can now only be advanced to position 8 by at least seven successive 1's and if a 0 appears before it reaches position 8, it will be reset to position 1 again. When it reaches position 8, it remains until a 0 is received, when both gates G1 and G2 are closed and normal stepping can be resumed. Thus, synchronisation can be effected in response to a predetermined minimum number of 1's followed by a 0 initially but if any reset operation occurs during this sequence, a minimum of seven 1's followed by a 0 is required subsequently for acceptance as a satisfactory synchronising signal.

FIGURE 2 shows how the same general principles can be employed to give a flywheel effect, whereby any failure during the first six 1's of a single synchronising signal will not initiate a hunting operation. In this case, the circuit is slightly more complicated and involves the use of a toggle M and delay line DL or its equivalent.

As before, the counter C1 will cycle continuously during the information channels and the counter C2 will be advanced until it reaches the synchronising position S in which the output TS is obtained. This is employed as before to test the next signal channel cycle incoming over the line which should be a normal synchronising signal. If this is seven 1's followed by a 0, neither gate G1 nor gate G2 can be opened so that there is no circuit for the toggle M. Accordingly the counter C1 is stepped straight ahead as during the information channels.

If, however, a 0 appears in what would normally be a sequence of 1's, gate G1 will be opened, whereupon one input is applied to gate G6 and on the next strobe pulse G8 opens to operate toggle M. However, in view of the inclusion of delay line DL in the set output of the toggle M, the gate G6 produces no immediate output and if the disturbance is not repeated, toggle M is reset by way of gate G9 at the end of the following synchronising signal.

If, however, the improper operation is repeated before toggle M has been reset, an output is obtained from gate G6 which thereupon resets the counter C1 to position 1 and by way of gate G3 inhibits the normal stepping circuit. Synchronisation can then only be effected in response to a minimum of seven 1's followed by a 0. The remainder of the circuit involving gates G2, G5 and G4 operates in the same manner as the circuit of FIGURE 1 to accept a synchronising signal of six 1's followed by a 0 during normal operation. This provides a simple flywheel effect by which an apparent loss of synchronisation for one frame may be neglected. If a longer period of inaction is required, this can readily be achieved, for instance, by putting a circuit with a suitable time constant between the toggle M and gate G1 or by increasing the delay period of delay line DL.

FIGURE 3 shows a modified arrangement working on the same general principles and including the flywheel effect but not however including the feature of the FIGURES 1 and 2 arrangements whereby the synchronising signal can be varied by reduction in the number of 1's therein. In this case also, as in the FIG. 2 arrangement, the counters C1 and C2 will cycle continuously during the information channels and during the synchronising chanel a test is made for the correct synchronising signal of seven 1's followed by a 0. If this is received, no output is obtained from gate G10 and the counters continue to cycle.

If, however, the sequence of 1's is broken by a 0, gate G1 will be opened since an output is obtained through the inverter I1 and similarly if a 1 appears in the T8 position where a 0 is to be expected, gate G2 will be opened. In either event, an output is obtained from gate G10 and on the next strobe signal applied to gate G8, the toggle M is set. If the fault which has produced this result is not repeated, toggle M is reset after the next synchronising signal by way of gate G9 and the operation continues normally. If, however, a further fault in the synchronising signal is received, so that the output from the delay line DL is effective, an output is obtained by way of gate G7 to inhibit the gates G3 and G5 and thus hold up the stepping of the counters. An output is also obtained from gate G6 if a 0 is obtained instead of a 1 and this has the effect of resetting the counter C1 to the first position. Accordingly, repeated testing takes place until a succession of seven 1's is obtained, whereby the counter C1 is advanced to position 8. As soon as a 0 is received thereafter, the inhibiting effect of gates G3 and G5 is removed so that stepping of the two counters concerned now takes place normally.

It will be apreciated that the delay line DL needs to have a delay of at least 8 and less than 192 elements and it is convenient to make the delay 16 elements as indicated in the drawing. It is therefore possible to use a resistor and a capacitor to produce this delay.

It can be seen that the system as described forms an economical way of synchronising two terminals and possesses the advantage that a very simple modification makes it possible to compensate automatically for the loss of digits due to the need for maintaining synchronism in a plurality of systems which are multiplexed.

We claim:

1. In a time division multiplex electrical signalling system employing signal elements of only two kinds and having one of the multiplex channels reserved for a synchronising signal, selectively operable testing means at the receiving end for testing the signals received over the assumed synchronising channel, said testing means including a resettable cyclic counting device, means for advancing said counting device through a complete cycle from a predetermined position in response to an acceptable synchronising signal, means for advancing said counting device one step responsive to a signal element of one kind, said means being effective in all positions of said counting device except the one preceding said predetermined position, and means responsive to a signal element of the other kind for advancing said counting device to said predetermined position if it occupies said preceding position and for resetting it to said predetermined position if it occupies any other positions.

2. In a time division multiplex electrical signalling system as claimed in claim 1, a gate circuit to which operating pulses for said counting device are supplied, said gate circuit being jointly controlled by the position occupied by said counting device and the nature of the received signal element so as to close and prevent further operation of said counting device if it occupies said preceding position and a signal element of said one kind is receved whereby variation of the number of signal elements of said one kind in an acceptable synchronising signal is made possible.

3. In a time division multiplex electrical signallng system as clamed in claim 1, a timing device arranged to inhibit the effective of said testing means for a predetermined time so that failure to detect an acceptable synchronising signal only holds up the receiving operation if it occurs on a predetermined number of successive occasions.

4. In a time division multiplex electrical signalling system as claimed in claim 3, in which said timing device includes a toggle circuit, means for setting said toggle circuit when said testing means fails to detect an acceptable synchronising signal, a delay device, connections for applying the set output of said toggle circuit by way of said delay device to remove the inhibition on the effect of said testing means, and means operated due to the detection of an acceptable synchronising signal by said testing means after the delay determined by said delay device for resetting said toggle circuit.

5. In a time division multiplex electrical signalling system employing signal elements of only two kinds and having one of the multiplex channels reserved for a synchronising signal, selectively operable testing means at the receiving end for testing the signals received over the assumed synchronising channel, said testing means including a resettable cyclic counting device, means for advancing said counting device through a complete cycle from a first predetermined position in response to an acceptable synchronising signal, means for advancing said counting device one step responsive to a signal element of one kind, said means being effective in all positions of said counting device except the one preceding said first predetermined position, means operative immediately prior to the receipt of signals over said assumed synchronising channel for resetting said counting device to a second predetermined position, and means responsive to a signal element of the other kind for advancing said counting device to said first predetermined position if it occupies said preceding position and for resettng it to said first predetermined position if it occupies any other position.

6. In a time division multiplex electrical signalling system employing signal elements of only two kinds and having one of the multiplex channels reserved for a synchronising signal, selectively operable testing means at the receiving end for testing the signal received over the assumed synchronising channel, said testing means including a resettable cyclic counting device, means for advancing said counting device through a complete cycle from a predetermined position in response to an acceptable synchronising signal, means for advancing said counting device one step responsive to a signal element of one kind, said means being effective in all positions of said counting device except the one preceding said predetermined position, means operative immediately prior to the receipt of signals over said assumed synchronising channel for resetting said counting device to the position following said predetermined position, and means responsive to a signal element of the other kind for advancing said counting device to said predetermined position if it occupies said preceding position and for resetting it to said predetermined position if it occupies any other position.

References Cited by the Examiner

UNITED STATES PATENTS

| | | | |
|---|---|---|---|
| 2,949,503 | 8/1960 | Andrews et al. | 179—15 |
| 3,065,302 | 11/1962 | Kaneko | 179—15 |

DAVID G. REDINBAUGH, *Prmary Examiner.*